United States Patent [19]
Kiri et al.

[11] Patent Number: 5,448,740
[45] Date of Patent: Sep. 5, 1995

[54] GENERATION OF A USER INTERFACE CODE FROM A CORRESPONDING DECLARATIVE LANGUAGE PROGRAM

[75] Inventors: Thomas Kiri, Herrenberg; Ralf Thelen, Sindelfingen, both of Germany

[73] Assignee: International Business Machines Corporation, Armonk, N.Y.

[21] Appl. No.: 130,487

[22] Filed: Oct. 1, 1993

[30] Foreign Application Priority Data

Dec. 15, 1992 [EP] European Pat. Off. ............ 92121325

[51] Int. Cl.⁶ .......................... G06F 9/00; G06F 9/445
[52] U.S. Cl. .................................................... 395/700
[58] Field of Search ................................ 395/900, 700

[56] References Cited

U.S. PATENT DOCUMENTS

| | | | |
|---|---|---|---|
| 4,742,467 | 5/1988 | Messerich et al. | 364/200 |
| 4,831,525 | 5/1989 | Saito et al. | 364/300 |
| 4,956,773 | 9/1990 | Saito et al. | 364/200 |

FOREIGN PATENT DOCUMENTS

| | | |
|---|---|---|
| 0515739 | 5/1991 | European Pat. Off. . |
| 9217838 | 8/1991 | WIPO . |

OTHER PUBLICATIONS

Proceedings 12th International Conf. Software Engineering—Mar. 26, 1990—pp. 310–315 by D. H. Bernstein, et al "Automatic Maintenance of Routine Programming Tasks Based On a Declarative Description".
"Automated COBL Code Generation for Snap-I Cap Devel. & Maintenance Procedures" by M. Buhrmaster—Report #ORNL-DSRD-8 Oak Ridge National Lab.
"Rapid Production of Graphical User Interfaces" by D. King & R. Prevott III, Naval Postgraduate School, Dec. 1990.
SC33-6451 "IBM Systems Application Architecture System View", Screen View User's Guide Ver 1 Release 2.
SC33-6452—"IBM Systems Application Architecture System View", Screen View Application Developer's Guide—Ver 1, Release 2.
SC33-6453 "IBM Systems Application Architecture System View", Screen View Application Developer's Reference Ver 1, Rel. 2.

*Primary Examiner*—Kevin A. Kriess
*Assistant Examiner*—A. Katbab
*Attorney, Agent, or Firm*—Peter L. Michaelson; JoAnn Kealy Crockatt

[57] ABSTRACT

A method for automatically generating a computer code of a procedural language program from a corresponding program in a declarative language. The declarative language program is analyzed to obtain information about variables to be described in the procedural language program and information about the data flow to be used in the procedural language program. The information extracted from the declarative language program in this analysis is combined with code blocks from a code block file to form the procedural language program that is compiled to form the computer code. This method finds particular application in a computer system with an input/output device, a processor and a memory for developing applications programs that comprise an interface declaration and a business logic. When resident in the computer system, the code generator performs the method to produce interface specific code to produce a user interface between a user and the applications program.

16 Claims, 9 Drawing Sheets

| NODE NAME | NODE CLASS | NODE CU | VAR NAME | VAR INIT | INIT LEN | NEW CU |
|---|---|---|---|---|---|---|
| CU1 | SET | CU1 | | | 0 | |
| LOOP | ITERATE | CU1 | BUTTON | X | 2 | CU2 |
| CU2 | SET | CU2 | | | 0 | |
| 4 | SELECT | CU2 | BUTTON | | 0 | |
| CU3 | LINK | CU2 | BUTTON | A | 2 | |
| CU3 | SET | CU3 | | | 0 | |
| 7 | SELECT | CU3 | BUTTON 3 | | 0 | |
| 7 | ESELECT | CU3 | BUTTON 3 | | 0 | |
| CU3 | ESET | CU3 | | | 0 | |
| CU4 | LINK | CU3 | BUTTON | B | 2 | |
| CU4 | SET | CU4 | | | 0 | |
| 10 | SELECT | CU4 | BUTTON 4 | | 0 | |
| 10 | ESELECT | CU4 | BUTTON 4 | | 0 | |
| CU4 | ESET | CU4 | | | 0 | |
| 4 | ESELECT | CU2 | | | 0 | |
| CU2 | ESET | CU2 | | | 0 | |
| LOOP | EITERATE | CU1 | BUTTON | X | 2 | CU2 |
| CU1 | ESET | CU1 | | | 2 | |

FIG. 8

| NODE NAME | NODE CLASS | NODE CU | VAR NAME | VAR INIT | INIT LEN | NEW CU |
|---|---|---|---|---|---|---|
| CU1 | SET | CU1 | | | 0 | |
| LOOP | ITERATE | CU1 | BUTTON | X | 2 | CU2 |
| CU2 | SET | CU2 | | | 0 | |
| 4 | SELECT | CU2 | BUTTON | | 0 | |
| CU3 | LINK | CU2 | BUTTON | A | 2 | |
| CU3 | SET | CU3 | | | 0 | |
| CU3 | ESET | CU3 | | | 0 | |
| CU4 | LINK | CU3 | BUTTON | B | 2 | |
| CU4 | SET | CU4 | | | 0 | |
| CU4 | ESET | CU4 | | | 0 | |
| 4 | ESELECT | CU2 | | | 0 | |
| CU2 | ESET | CU2 | | | 0 | |
| LOOP | EITERATE | CU1 | BUTTON | X | 2 | CU2 |
| CU1 | ESET | CU1 | | | 2 | |

GENERATION OF A USER INTERFACE CODE FROM A CORRESPONDING DECLARATIVE LANGUAGE PROGRAM

BACKGROUND OF THE INVENTION

1. Field of the Invention

The present invention relates to a method for automatically generating computer code from a declarative language. It further relates to a computer system incorporating a code generator for automatically generating code.

2. Background

A declarative language is defined in the IEEE Standard Computer Dictionary as "a non-procedural language that permits the user to declare a set of facts and to express queries or problems that use these facts". The way in which user interfaces are described in the IBM ScreenView Program Product is an example of a declarative language.

The IBM ScreenView Program Product is a product for developing and running a consistent set of applications programs. The product comprises two parts: run time services to provide services to applications at run time and application development services which support programmers to develop various user interfaces for those applications.

In the ScreenView environment, the functional or business logic of an application is separated from the presentation or interface logic of an application. The presentation logic of an application is described by the application developer with the declarative language mentioned above. This guarantees independence of the functional parts of an application from the user interface technologies and allows an easy adaptation to new technologies and standards in the future.

The IBM ScreenView product is described in the manuals ScreenView Application Developer's Guide (IBM Form Number SC33-6452), ScreenView Application Developer's Reference (IBM Form Number SC33-6453) and ScreenView User's Guide (IBM Form Number SC33-6541) which are hereby incorporated by reference.

3. Prior Art

PCT Application WO-EP91/01642 discloses a method for specifying user interfaces in a declarative language which are independent of the type of interface used. With each user interface is associated a presentation front end which controls the input/output device associated with the interface specified.

The method of the PCT application PCT/EP91/01642 is very powerful in that it allows an end user to switch between interfaces to an applications program whilst the applications program is being used. However, use of the method is complicated by the fact that the developer of the applications program has to write the interface-independent code for the interface between the business logic and the presentation front end.

Since the declarative language defining the interface is abstract, exceptional programming skills are required to generate error-free code and the development of such code requires a large amount of time. In addition, one must ensure that the value of the variables requested or output by the interface correspond to the variables used in the business logic.

U.S. Pat. No. 4,742,467 describes an automated applications program development system and method which enables the automated development of COBOL programs. In this patent, the program developer utilizes graphics in order to paint a picture of the task to be carried out or the program to be developed. After the design phase has been completed, the program developers answers a series of question posed by the development system and a COBOL source program is then automatically generated, together with program documentation.

The code generator described in this patent does not use a declarative language from which the COBOL code is to be generated and gives no indication about how the code generating method might be extended to any declarative language. In addition, the teaching of this patent does not separate the user interface of the applications program from the business logic of the applications program. Thus, incorporating a new interface into the program will require redesign of the program, which is time consuming and expensive. In particular, the order in which the program requires inputs and outputs is determined not by the requirements of the interface but by the dictates of the program data flow.

A report entitled "Automated COBOL Code Generation for SNAP-I CAI Development and Maintenance Procedures" by M. A. Buhrmaster et al. of the Oak Ridge National Laboratory, report number ORNL/DSRD-8 describes research sponsored by the US Federal Government Department of Energy to develop a computer aided instruction (CAI) prototype for the U.S. Navy Management System Support Office as part of the Shipboard Non-tactical ADP Program (SNAP). The report discusses the techniques applied to store, access and manipulate data from a database management system (DBMS) to produce the necessary COBOL source code. The report does not, however, teach the use of a declarative language from which the COBOL code is generated nor does it provide for the use of multiple interface types.

A thesis presented by David Maurice King and Richard Montgomery Prevat III at the Naval Postgraduate School in Monterey, Calif. in December 1990 for the Master of Computer Science entitled "Rapid Production of Graphical User Interfaces" describes a tool, the Naval Postgraduate School Designer and Toolbox, which provides an automated development environment that enables design, implementation, modification and testing of customized graphical user interfaces. The tool can be used to create windows, panels and actuators for a graphical interface. A code generator can then be used to produce compatible C-language source code. The source code is compiled and linked to the applications program in order to produce a runnable program.

The teachings of this thesis are only applicable to the generation of source code which is used to produce graphical interfaces. The source code generator described produces not only the code required to ensure correct inputs and outputs but also the code required to generate the windows, panels and actuators. It cannot be used in order to generate interface-independent code. There is furthermore no indication about how the teachings of this patent may be applied to the use of a declarative language used to describe the interface to an applications program.

A product developed by Caseworks Incorporated called Case PM allows a developer to automatically generate Presentation Manager code. The code thereby developed is only suitable for use in programs using Presentation Manager as a direct management interface and there is no indication how the product might be used in interfaces other than graphic interfaces. Additionally the product does not allow a division between the business logic of the program and the interface code.

U.S. Pat. No. 4,956,773 and U.S. Pat. No. 4,831,525 both describe an information processing system in which schematic information relating to the data and logic processing of a program is input from a display screen using processing flow diagrams, internal data definition diagrams and interface data definition diagrams for each module of the program. The schematic information for each module is used to generate individual source code programs for each module which can then be edited and put together to form a complete source code program.

Both of these patents teach the use of methods in which the business logic of an applications program is automatically coded using a source code generator from the input schematic information. The teachings cannot be applied to the generation of source code for interfaces whose order depends on the variables to be input and the type of interface chosen for the business logic.

SUMMARY OF THE INVENTION

The problem therefore to be solved by this invention is to develop a method for generating computer code which overcomes the above disadvantages.

This problem is solved by a method for automatically generating computer code in a procedural language from a program in a declarative language which comprises a first step of analyzing variables of the declarative language program to obtain information about the variables, a second step of analyzing data flow of the declarative language program to obtain information about the order in which communications units are used, a third step of extracting from a code block file fragments of procedural language code and a fourth step of mixing the variable information and the data flow information to produce computer code in a procedural language.

The first step of this method can advantageously be carried out by establishing a first communications unit list in which each element of the first communications unit list comprises the names of the communications units in the declarative language and also comprises pointers to variable lists for those variables included in the communication unit, whereby the information in the variable lists comprises at least the name of the variable, the type of the variable and the access type of the variable. The code block file will then contain separate code blocks for each variable type.

The second step can be advantageously carried out by establishing a second communications unit list in which each element of the second communications unit list comprises a language element of the declarative language, the communications unit being operated on and a pointer to the next communications unit to be operated on. The code block file contains separate code blocks for each declarative language element.

The inventive method particularly finds applications in a method for automatically generating interface code for an applications program with a user interface defined using a declarative language (such as that used in the ScreenView program product) and with a business logic which comprises a first step of analyzing the user interface to establish information about the variables used in the user interface, a second step of analyzing the user interface to establish the order in which communications units in the user interface are processed, a third step of extracting from a code block file fragments of procedural language code and a fourth step of mixing the variable information and the data flow information to produce interface code in a procedural language.

The invention is implemented in a computer system comprising an applications program having an interface declaration and a business logic, and a code generator with a code block file to automatically generate code, where the computer system further includes a first communications unit list in which the order in which communications units are processed is given, a second communications unit list in which variables associated with the communications units are given and a plurality of variable lists in which information about the variables in the communications units is given. The code generator uses code blocks from the code block file and the first and second communications unit lists and the plurality of variable lists to produce interface code. In this computer system, the interface code is independent of the interface used.

The computer system further comprises input/output device code to operate said input/output devices as well as linkage means to link said generated interface code with said input/output device code.

DETAILED DESCRIPTION OF THE INVENTION

Figure 1:
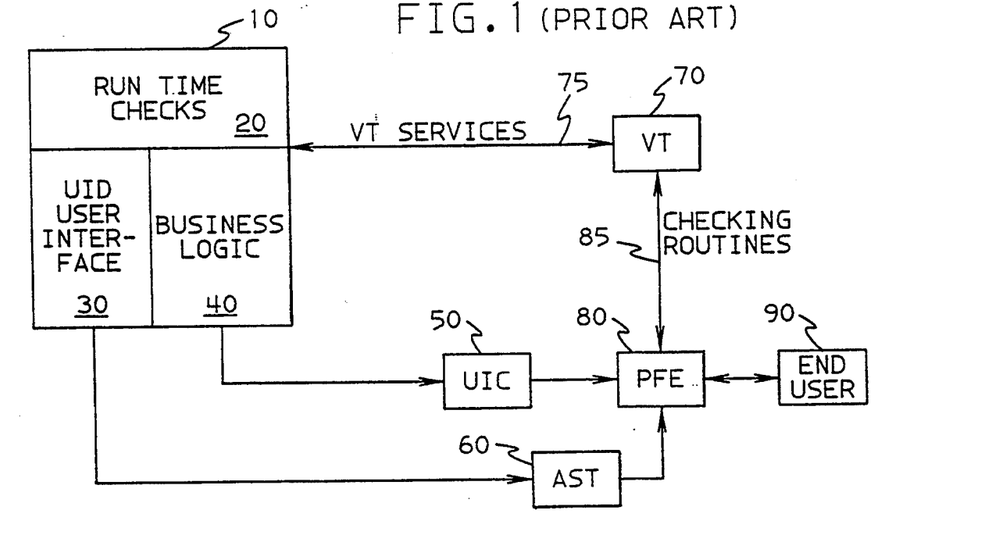
FIG. 1 is an overview of the prior art IBM ScreenView Program Product.

FIG. 1 shows an overview of the IBM ScreenView Program Product. An applications program 10 is divided into code relating to the user interface 30, code relating to the business logic 40 and code used for run time checks 20. The business logic 40 is the heart of the program and actually performs the task for which the program is designed. The user interface 30 is interface-independent code which builds the connection between the business logic 40 and the external environment. It provides the information about which data is to be input to the business logic 40 and specifies which data is to be output from the business logic 40 in a form which is independent of the interface specified by the user. The user interface 30 is specified by an abstract declarative language, the so-called user interface declaration (UID). The user interface declaration is converted to an abstract syntax table (AST) 60 which is the machine readable form of the UID 30.

The UID 30 and the AST 60 are described in detail in the co-pending PCT application WO-EP91/01642. It should be noted that in this co-pending application, the UID 30 is termed the User Interface Information (UII) and the AST 60 is termed the User Session Data. Tools are provided by ScreenView to convert the UID 30 into the AST 60. The information in the AST 60 may be accessed in one of two ways as shown in the co-pending PCT application WO-EP91/01642: either in the form of an AST table or in the form of an AST tree.

An end user 90 of a ScreenView applications program 10 communicates with the applications program 10 through a universal interface conductor 50 and a presentation front end 80. The presentation front end 80 contains the code relating to the specific interface chosen by the end user 90 to communicate with the applications program 10. The end user 90 may chose to communicate with the applications program 10 by means of a command line, by means of windows, by means of voice input, by means of a touch screen or by other means. The presentation front end 80 uses the AST 60 generated from the UID 30 to produce the required interface for the applications program 10. The universal interface conductor 50 provides the communication services between the business logic 40 of the applications program 10 and the end user 90 through the presentation front end 80. In particular, the universal interface conductor 50 establishes the communications units which are the subsets of the application logic's variables that are to be presented to the end user 90 during any particular interaction. The universal interface conductor 50 communications services are described in the aforementioned ScreenView Applications Developer's Reference, pp. 211–214.

A variable table (VT) 70 is also supplied by ScreenView. The variable table 70 is a further means of communication between the business logic 40 of an applications program 10 and the presentation front end 80. In the variable table 70 all variable values defined in the UID 30 are stored. The applications program 10 places all the variable values that the end user 90 needs into the variable table 70 using variable table access services 75 and it also finds in the variable table 70 the input from the end user 90. The presentation front end 80 communicates these values to the end user 90 from the variable table 70 and from the end user 90 to the variable table 70. Checking routines 85 are provided to validate the variables. The variable table access services 75 are described in more detail in the aforementioned ScreenView Application Developer's Reference, pp. 215–238.

Figure 2:
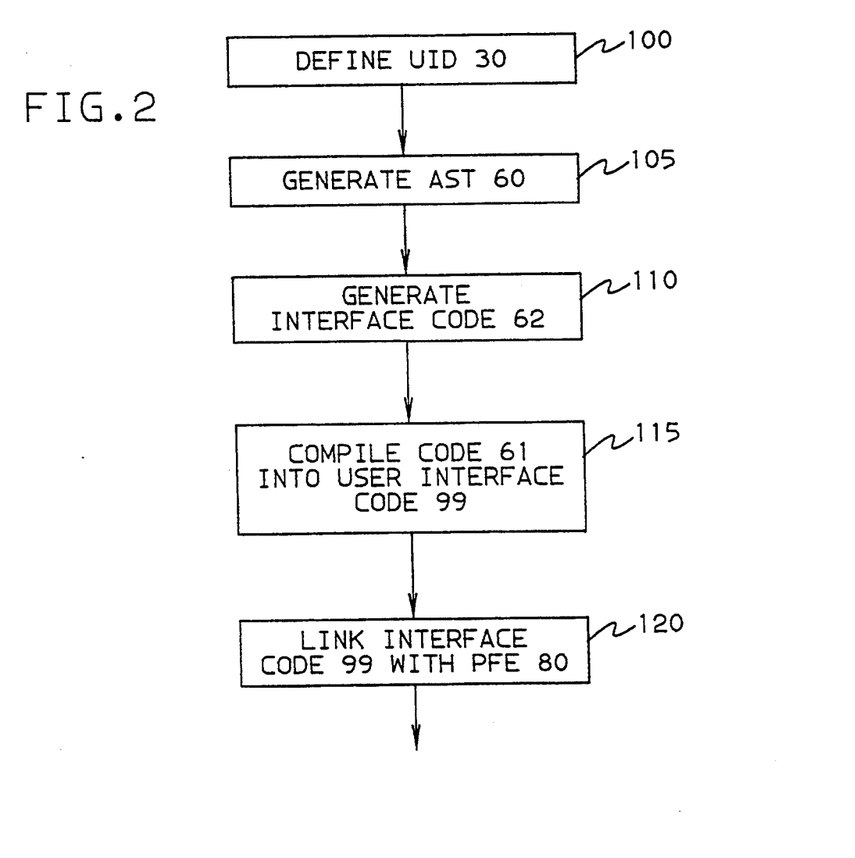
FIG. 2 is a flow diagram which describes how an interface to the business logic of an applications program is generated in accordance with the present invention.

FIG. 2 shows the steps involved in the development of an executable user interface code 99 for use in an applications program 10.

Figure 10:
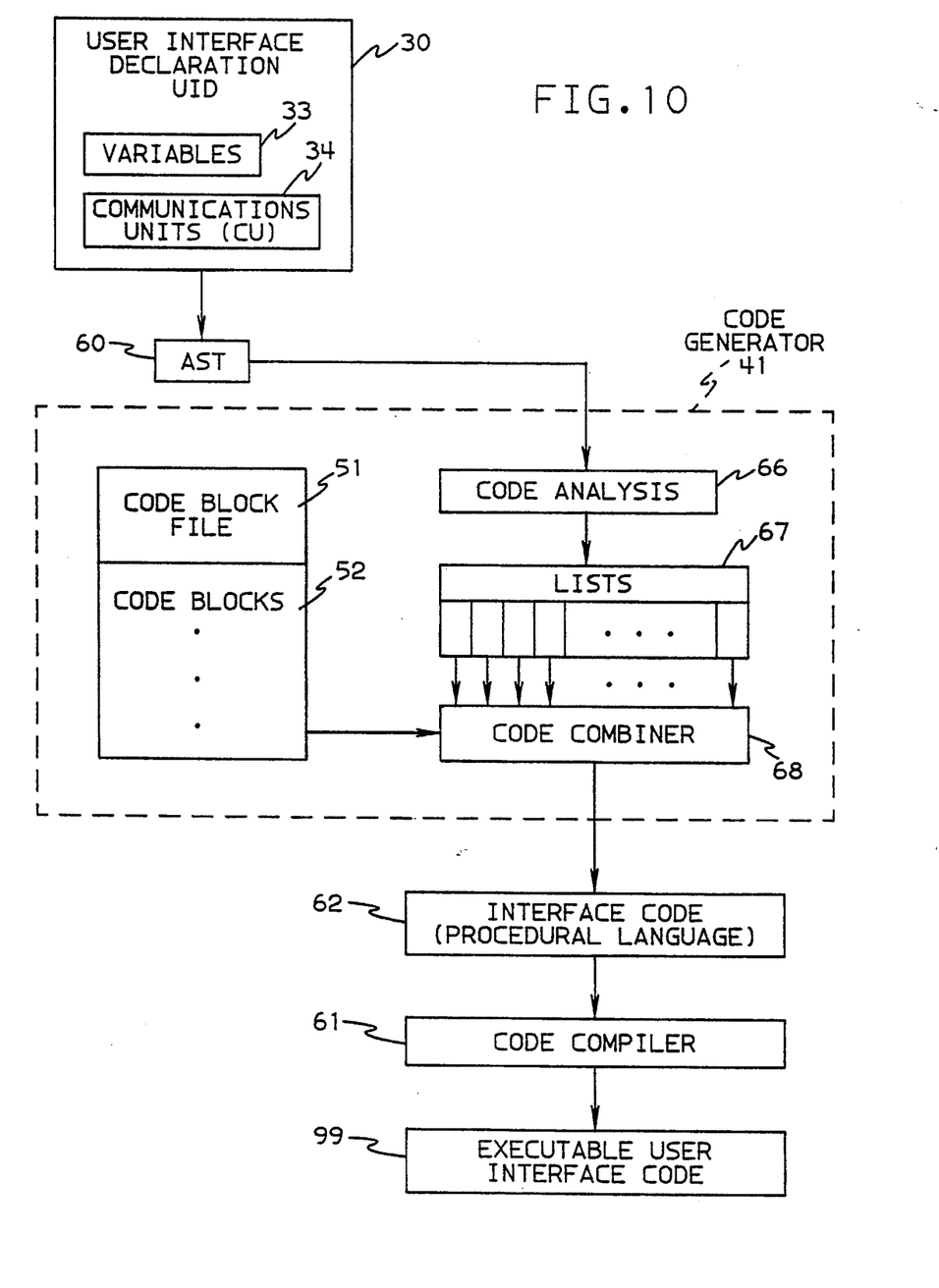
FIG. 10 is an overview of the present invention.

FIG. 10, which is an overview of the present invention, shows AST 60 connected to code generator 41 for automatically producing interface code 62 in a procedural language. Interface code 62 is compiled by code compiler 61 to produce an executable user interface code 99. In step 100, the UID 30 is defined with the help of an abstract declarative language. The elements of this language are outlined below. After the UID 30 is defined, it is converted to the machine readable AST 60 in step 105. From the AST 60, interface code 62 relating to the UID 30 defined in step 100 is automatically generated by code generator 41 in step 110. In the preferred embodiment, C language code is used. However, the teachings of this patent are also applicable to the automatic generation of code in any other procedural computer language. The generated interface code 62 is compiled by code compiler 61 to generate an executable user interface code 99 in step 115. In the preferred embodiment, the compiler 61 used is the IBM C/2 compiler. However, any other C compiler could be used to compile C code generated by step 110. Finally in step 120, the generated code 99 is linked to the presentation front end code 80 in order to produce the interface for the applications program 10.

As mentioned above, the UID 30 is described with the help of an abstract declarative language. The most important elements of this language will now be described. These language elements are only examples of the language elements that may be used and are more fully described in the aforementioned ScreenView Applications Developer's Reference, pp 21–53.

| | |
|---|---|
| <ALT> | Defines an alternative selection. |
| <ELEMENT> | Defines an independent item or a column of a list. |
| <ITERATE> | can either define<br>i) a list of elements<br>or<br>ii) the iteration of communications units. |
| <SELECT> | Denotes a set of alternative choices. |
| <SET> | Denotes a set of elements. |

These language elements can be combined with parameters to describe more complicated structures in the UID 30. For example:

1) Description of a Communications Unit

| | |
|---|---|
| <SET> | "sample window"<br>general: communit = window |
| ... | |
| ... | |
| ... | |
| <ESET> | |

This provides the name of a communications unit 34 (window) which is to be specified with a communications unit request. The subset of the applications program's variables 33 included in the communications unit 34 are defined as those variables 33 operated on by the declarative language instructions appearing between the <SET> and <ESET> instructions and are represented here by the series of full stops.

2) Description of Variable

| | |
|---|---|
| <ELEMENT> | "First Entry"<br>general: varname = name1<br>valuetype = alphanum<br>valuelength = 20<br>accesstype = inout |

This provides an item in a set of elements. The item is named name1 and is alphanumeric in nature with a length of 20 characters. As indicated by the value of the parameter "accesstype", it can be used as both an input and output type variable.

3) Description of Alternatives

| <SELECT> | Radiobutton |
| | general: varname = radio |
| | valuelength = 1 |
| <ALT> | "Button 1" |
| | general: value = 1 |
| <ALT> | "Button 2" |
| | general: value = 2 |
| <ALT> | "Button 3" |
| | general: value = 3 |
| <ESELECT> | |

In this example, the variable name "radio" which has a length of 1 character can take either of the values 1, 2 or 3 depending on which of the alternatives "Button 1", "Button 2" or "Button 3" are selected.

4) Description of Iteration of a Communications Unit 34

(Definition ii) of <ITERATE> language element)

| <ITERATE> | |
| | general: exit = "END" |
| <SET> | |
| <SELECT> | |
| | general: varname = SEL |
| <ALT>"END" | |
| | general: value = E |
| <ALT> | "Choice 1" |
| <ALT> | "Choice 2" |
| ... | |
| ... | |
| ... | |
| <ALT> | "Choice n" |
| <ESELECT> | |
| <ESET> | |
| <EITERATE> | |

In this example, the end user 90 is continually presented with a selection of choices, Choice 1, Choice 2, . . . , Choice n and an "END" choice. Each selected element is added to a set until the end user 90 chooses "END" at which point the iteration finishes and the value of the variable name varname=SEL, is set to the value E from the selection "END".

The UID includes variables 33 of the following types:
i) Normal Variable

These are variables with a defined length, e.g.:

| <ELEMENT> | "First Entry" |
| | general: varname = name1 |
| | valuetype = alphanum |
| | valuelength = 20 |
| | accesstype = inout | ii) Multiline Entryfield

These are represented by variables of variable length, e.g.:

| <ELEMENT> | "Multiline Entry" |
| | general: varname = multi |
| | accesstype = inout |
| | required = no |

The parameter "required" specifies whether an input value for the related variable 33 is required or optional.

A multiline entryfield variable 33 does not need to be filled and hence the parameter "required" is set to "no".

iii) Outlist

An outlist is a list which is presented to an end user 90 and out of which the end user 90 can select a line. Using the <ELEMENT> language element, the columns forming a line of the list are described. Using definition i) of the <ITERATE> language element, the complete list may be generated.

An example of an outlist is the following:

| <ITERATE> | "List Box" |
| | general: varname = listentry |
| | valuetype = alphanum |
| | valuelength = 25 |
| | outlist = list1 |
| <ELEMENT> | Column1 |
| | general: varname = column1 |
| | valuetype = alphanum |
| | valuelength = 10 |
| | accesstype = out |
| <EITERATE> | |

This generates a list of 25 entries with the name "listentry" which can be formed of alphanumeric characters. The list has only one column. Each entry in the column may be up to 10 alphanumeric characters in length.

iv) Inlist

An Inlist is a subset of the entries of an outlist that has been selected by a user. The Inlist is generated using definition i) of the <ITERATE> language element and presenting to the end user 90 elements of an outlist which can be selected to form the Inlist.

v) Shared

Shared variable are those variables 33 which are shared between multiple communications units 34. An access authorization type is defined for each of the variable types by the "accesstype" parameter. Three types of access parameters may be defined:

i) accesstype=in

The value of the variable may be input by the end user 90 and is not changed by the applications program 10.

ii) accesstype=out

The value of the variable is set by the applications program 10 and may not be overwritten by the end user 90.

iii) accesstype=inout

The value of the variable may be input by the end user 90 and may be changed by the applications program 10.

In addition to the description of the user interfaces in the UID 30, the order in which the communications units 34 are processed (data flow) is also described. Thus the UID 30 contains not only information about the appearance of the user interfaces but also about the sequence (data flow) in which they appear. The most important language elements used to describe the sequence (data flow) of the communications units 34 are:

1) Reference to a new communications unit
<LINK> NEW_CU

In this example, all further operations described in the UID 30 after this command are carried out on the variables given in the new communications unit NEW_CU.

Figure 3A:
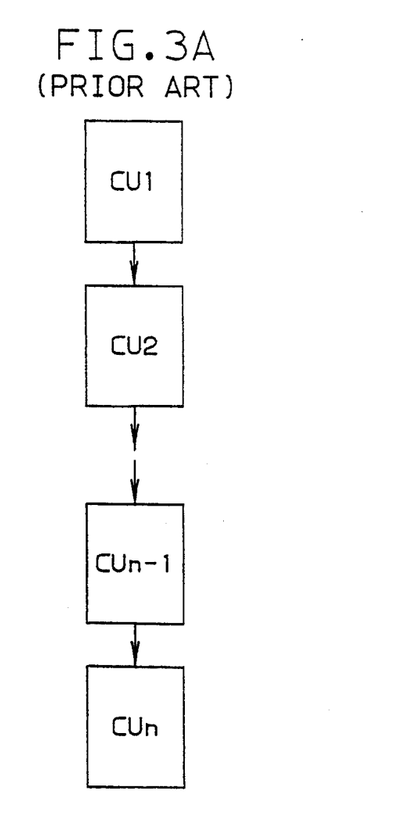
FIGS. 3A–3C are examples of the sequences in which communications units are processed in the prior art Product of FIG. 1.

The <LINK> statements can be gathered together in a set as illustrated in FIG. 3a. The structure depicted is described in the UID 30 by the following declaration:

```
<SET>
              general: communit = CU1
    <LINK> CU2
    <LINK> CU3
    ...
    ...
    ...
    <LINK> CUn-1
    <LINK> CUn
<ESET>
```

In this example, once the variables in the communications unit CU1 are called, then the variables in the communications units CU2 to CUn will be called in sequence.

2) Conditional reference to a new communications unit

```
<SELECT>
              general: varname = radiobutton
              valuetype = alpha
              valuelength = 1
    <LINK>    "Change text"
              general: value = A
    <LINK>    "Print text"
              general: value = P
<ESELECT>
```

In this example, the end user 90 is given the choice of two communications units 34, "Change text" and "Print text", of which the end user 90 has to select one. If "Change text" is selected, then the variable name "radiobutton" takes the value A and subsequent references to variables 33 in the UID 30 are references to the variables in the communications unit "Change text". If, however, the end user 90 selects "Print text" then the variable name "radiobutton" takes the value P and subsequent references to variables 33 in the UID are references to the variables in the communications unit "Print text".

Figure 3B:
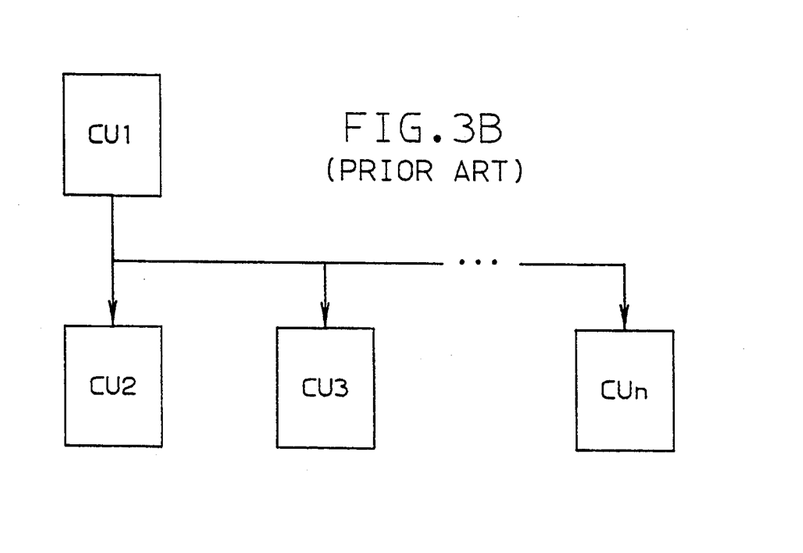

Another method of depicting this is shown in FIG. 3b which has the following declaration:

```
<SET>
              general: communit = CU1
    <SELECT>
        <LINK> CU2
        <LINK> CU3
        <LINK> CUn
        ...
        ...
        ...
    <ESELECT>
<ESET>
```

In this example, after the variables in the communication unit CU1 are called, the end user 90 is presented with a choice which of the communications units CU2 to CUn to call and thus to use the variables contained therein.

3) Loop around several communications units

```
<ITERATE>
              general: exit = END
    <SET>     "Print text"
              general: communit = Print
    <ESET>
```

<EITERATE>

In this example, the action associated with the communications unit "Print" will be repeatedly undertaken until the end user 90 indicates that no more action is required by signalling END. The signalling of END can be carried out in a number of ways, e.g. by selecting an END button or an END menu choice.

Figure 3C:
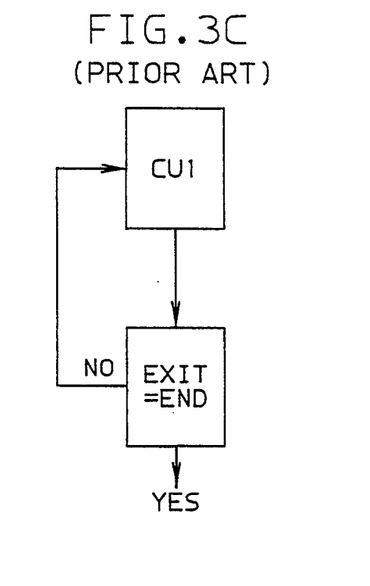

Another example of such a loop is shown in FIG. 3c which is described by the following declaration:

```
<ITERATE>
              general: exit = END
    <SET>
              general: communit = CU1
    <SELECT>
        <ALT>     alt1
        <ALT>     alt2
        <ALT>     alt2
        ...
        ...
        ...
        <ALT>     END
    <ESELECT>
    <ESET>
<EITERATE>
```

In this example, once the variable in the communications unit CU1 are called, then the user carries out various actions on these same variables until an END action is initiated, at which point other actions are carried out.

It should be noted that in the examples of the declarative language given above, only a skeleton outline is shown in order to illustrate the use of the language elements. In practice, each language element will have many more parameters associated with it and further actions will be carried out on the variables 33 within each of the communications units 34. These actions may be specified by other language elements in the UID 30.

As mentioned above, the UID 30 is a program written in a declarative language by the programmer of the applications program 10 in order to describe the user interface to the business logic 40. The UID 30 cannot, however, be directly accessed by the presentation front end 80 and must be converted into a machine readable format termed the AST 60. A description of the relationship between the UID 30 and the AST 60 is given in co-pending PCT application WO-EP91/01642. A brief description will be given here by means of an example.

Consider the following UID 30

```
<SET>         CU1
              general: communit CU1
    <LINK>    Loop
<ESET>
<ITERATE>     Loop
              exit = END
    <SET>     CU2
              general: communit = CU2
    <SELECT>
              general: varname = button
        <LINK>    CU3
                  value = A
        <LINK>    CU4
                  value = B
        .
        .
        .
        <ALT>     END
                  value = X
```

```
            -continued
<ESELECT>
    .
    .
    .
<ESET>
<EITERATE>
<SET>        CU3
                 general: communit = CU3
<SELECT>
    .
    .
    .
<ALT>
    .
    .
    .
<ESELECT>
    .
    .
    .
<ESET>
<SET>        CU4
                 general: communit  CU4
    .
    .
    .
<SELECT>
    .
    .
    .
<ALT>
    .
    .
    .
<ESELECT>
    .
    .
    .
<ESET>
```

In this description, the full stops indicate further non-illustrated language elements.

The UID 30 as given above is converted by routines available in the ScreenView product into the machine readable form, the AST 60. The AST 60 can be accessed in one of two ways: either as an AST tree as shown in FIG. 4 or as an AST list.

Figure 4:
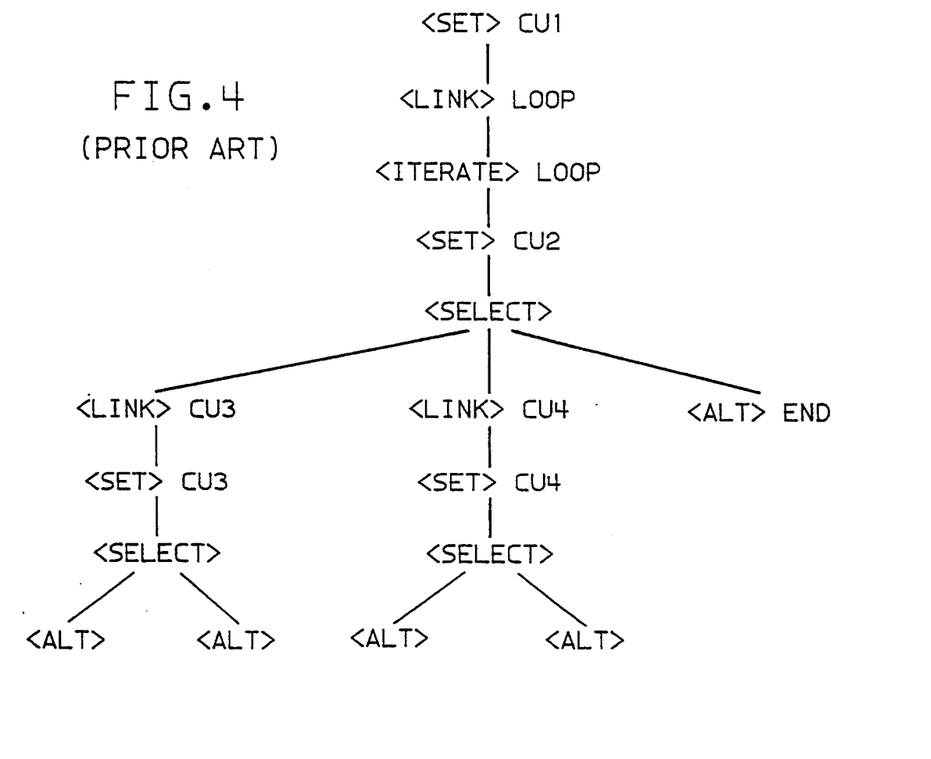
FIG. 4 is an example of a universal interface declaration used in the prior art IBM ScreenView Program Product of FIG. 1.

The AST tree in FIG. 4 illustrates the sequence in which the various communication units are called. The top of the tree represents the beginning of the program and the communications unit CU1 is called. The interface then links to a loop and iterates through this loop. At every pass through the loop, the communications unit 34 CU2 is called at which point the end user 90 must select whether to link to the communications unit CU3 or CU4 or whether to where the iteration through the loop by selecting END. In the example shown, by choosing either of the communications units CU3 or CU4, the end user 9C will be presented with a selection of further alternatives from which a choice must be made.

In FIG. 4 each of the language elements, e.g. <SET>, <LINK>, <ITERATE> or <SELECT> are at nodes of a tree. The language elements <ALT> are the child nodes of the tree.

The AST list is another way of describing the same AST 60. It consists of a list of elements, one element for each node in the tree, and includes information about the name of the node, the nesting level of the node within the hierarchy and the type of the node (AND-node, OR-node etc).

Figure 11:
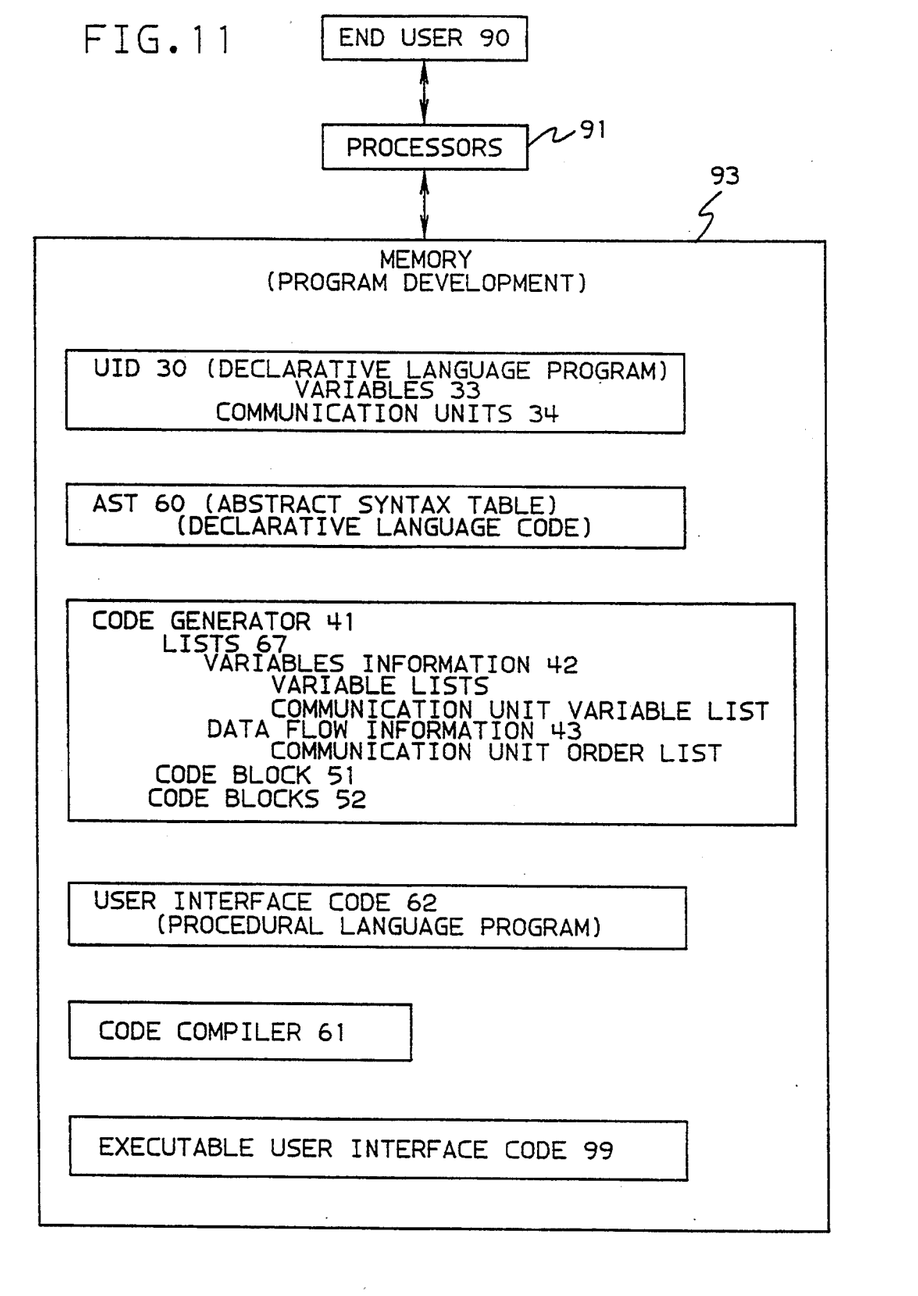
FIG. 11 depicts a computer system during program development in accordance with the present invention.

Once the UID 30 has been defined by the programmer of the applications program 10, then the interface code 62 (step 110 of FIG. 2) must be generated. This is carried out in a separate code generator 41 as shown in FIGS. 10 and 11. Once the interface code 62 has been generated from the defined UID 30, it can be used every time the applications program 10 is used, it does not need to be regenerated. If, however, the UID 30 is changed, then the code 62 has to be regenerated.

Alternatively, it would be possible for the skilled programmer to alter the generated interface code 62 directly.

In order to generate the interface code 62 from the UID 30, the code generator 41 must analyze the structure of the UID 30. In this analysis, the code generator identifies which parts of the UID 30 are always present, e.g. the opening and closing of the communication between the presentation front end 80 and the UID 30 or the writing of information into the variable table 70. The code generator 41 will also determine which parts of the interface code 62 are dependent on the structure of the UID 30, e.g. the use of the variables 33 or the sequence (data flow) of the various communications units 34.

Figure 12:
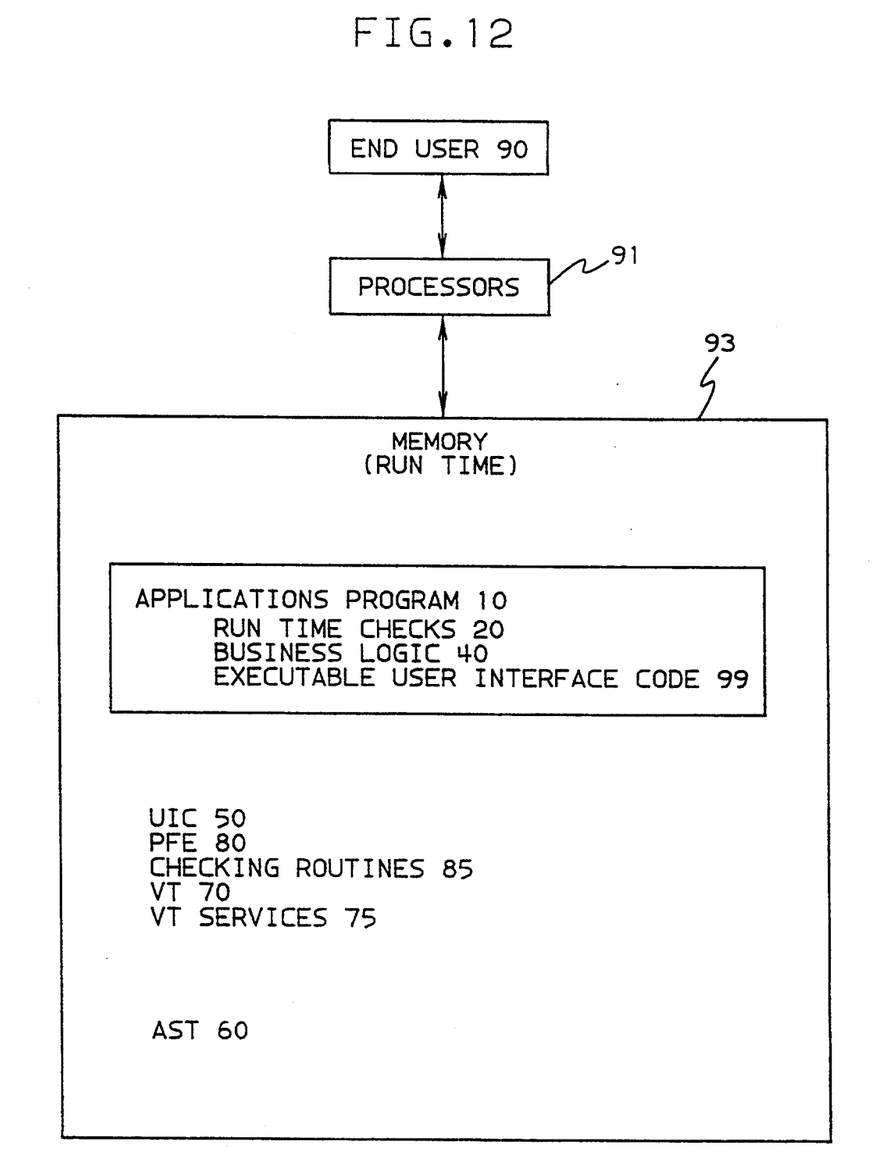
FIG. 12 depicts a computer system during run time in accordance with the present invention.

As seen in FIG. 2 (step 110) and FIG. 10, code generator 41 analyzes the structure of UID 30 by analyzing the machine readable data contained in AST 60. The structure of UID 30 is contained in its variables 33 and communications units 34. The machine readable AST 60 is analyzed in code analysis 66 of code generator 41 in a manner described below in detail with respect to FIG. 5. Code analysis 66 generates a set of lists 67 (e.g., see FIGS. 6-8) which contain variables information 42 and data flow information 43. Code combiner 68 generates the interface code 62 by combining information from lists 67 with appropriate code blocks 52 extracted from code block file 51 in a manner described below with respect to FIG. 9. FIG. 11 schematically illustrates a general purpose computer system having a main memory 93 containing the important elements of the invention during the program development environment. FIG. 12 illustrates the computer system during run time wherein applications program 10 includes the executable user interface code 99 that was compiled by code compiler 61 in step 115 of FIG. 2. Before describing the actual operation of the code generator 41, it is necessary to understand what type of code instructions must be generated.

The types of variables 33 used in the UID 30 have already been described. The code generator 41 must generate different types of interface code 62 for these variables 33. When generating the interface code 62 for a normal variable 33, the code generator 41 must produce lines of code which
    allocate memory space
    write the variable's value into the allocated memory space
    write the variable's value from the allocated memory space into the variable table (70)
    provide the variable's value from the variable table 70 to the business logic 40

For both multiline entry fields and outlists, the code generator 41 must provide lines of interface code 62 which carry out the following actions:
    allocate memory space
    initialize the variable
    write the variable's value into the reserved memory space
    write the variable's value from the reserved memory space into the variable table 70 provide the variable's value from the variable table 70 to the business logic 40
deallocate memory space For each of the different types of variables 33, the code generator 41 has stored in a code block file 51, the basic code structure which has to be generated. The code generator 41 then extracts the variable names, variable lengths, variable types and any other necessary variables information 42 from the UID 30 as described below. This information 42 is inserted into the appropriate places in the code blocks 52 to generate interface code 62.

The exact code blocks 52 used to carry out these tasks, which are included in the generated interface code 62, depend on the procedural language used and may be programmed by any skilled program developer. However, in order to illustrate the invention, some descriptions of the code blocks 52 required to produce C code are illustrated.

i) Normal Variables

These are valid variables 33 which are neither multiline entryfields nor outlists.

The code generator 41 first produces code which defines the variable in the header to the program using its name (VarName) and its length (VarLength). Note that some languages, e.g. C, require the variable length to be defined to be one greater than its actual length. From the communications units 34 in which the variable with this variable name (VarName) appears, the code generator 41 extracts the variable's value if the parameter "accesstype" is defined out or inout and produces code to present this value to the end user 90. The code generator 41 also produces code which establishes a space for the variable in the variable table 70 and, irrespective of access type of the variable, produces code to write the value of the variable into the variable table 70. No special code blocks are required to de-allocate memory space since the variable appears in the header to the file.

ii) Multiline Entryfield

A variable of the type multiline entryfield is a variable of variable length. The code generator 41 produces in the header file, a pointer to the position in the communications unit data space (i.e. the area of memory allocated to store the values of the variables 33 of the communications unit 34) in which the multiline entryfield variable is to appear. The code generator 41 then allocates a default amount of memory space in the communications unit data space to store the multiline entryfield variable. Should the length of the multiline entryfield variable later exceed that of the allocated memory space, then it may be reallocated within the communications unit data space.

From the communications units 34 in which the multiline entryfield variable appears with the access type out or inout, the code generator 41 extracts the value of the variable from the AST 60 and generates code to present this value to the end user 90. The code generator 41 then produces code which establishes a place for the multiline entryfield variable in the variable table 70 and writes the value of the variable, irrespective of the variable's access type, into the variable table 70.

The code generator 41 must produce code which allocates memory space for the multiline entryfield in the checking routines 85 for those variables 33 that have an access type of in or inout.

Finally, the code generator 41 produces code which deallocates the allocated memory spaces for the checking routines 85 and in the communications and data space.

iii) Outlists

A variable with the type outlist is handled as a pointer to an array of characters. An additional variable is required in order to indicate the number of entries in the outlist. The code generator 41 generates code in the header program which contains a pointer to the position of the outlist variable in the communications unit data space and also assigns to a variable the maximum length of the outlist (i.e. maximum number of entries).

In the main routines, the code generator 41 initializes the outlist by setting the pointer to a null value and the variable indicating the number of entries in the outlist to zero. Code is produced to establish in the variable table 70 a header for the outlist.

The code generator 41 next produces code to allocate memory space to the outlist variable in the communications unit data space using the variable indicating the maximum length of the outlist. The reserved memory is filled with blanks. The code generator 41 analyses the UID 30 as outlined below and extracts any defined values in the outlist and generates code which will place them into the reserved memory space and after which into the variable table 70 at a position after the header of the outlist. Finally the code generator 41 generates code which deallocates the memory space.

Similarly, when analyzing the UID 30, the code generator 41 must generate lines of interface code to process the communications units 34 in the manner in which they are described in the UID 30. In order to ensure an efficient and accurate analysis of the UID 30, the following convention must be observed by the programmer of the UID 30:

a new communications unit 34 may only be defined in the general section of the <SET> language element.

a new communications unit 34 may only be addressed using the <LINK> language element.

a new communications unit 34 must always be addressed using the <LINK> language element.

no loops may defined using the <LINK> language element (the <ITERATE> language element provides the possibility of defining loops).

Taking the communications units in FIG. 3 as an example and using C language code, the following code structures will be generated:

For FIG. 3a:
Process CU1
Process CU2
...
...
...
Process CUn-1
Process CUn

For FIG. 3b:
Process CU1
if (alternative)
Process CU2
else (alternative)
Process CU3
...
...
...
else (alternative)
Process CUn For FIG. 3c:
do
Process CU1

```
while (exit = /END)
```

Using these basic code blocks 52, the sequence (data flow) of communications units 34 processing may be generated by the code generator 41. The code generator 41 stores in a code block file 51 the basic structure of the source code that must be produced whenever it encounters the language elements <SET>, <ITERATE>, <LINK> etc. This code includes variable items whose exact value must be extracted from the UID 30 as explained below. These items include the names of the communications units 34, variables 33 etc.

Figure 5:
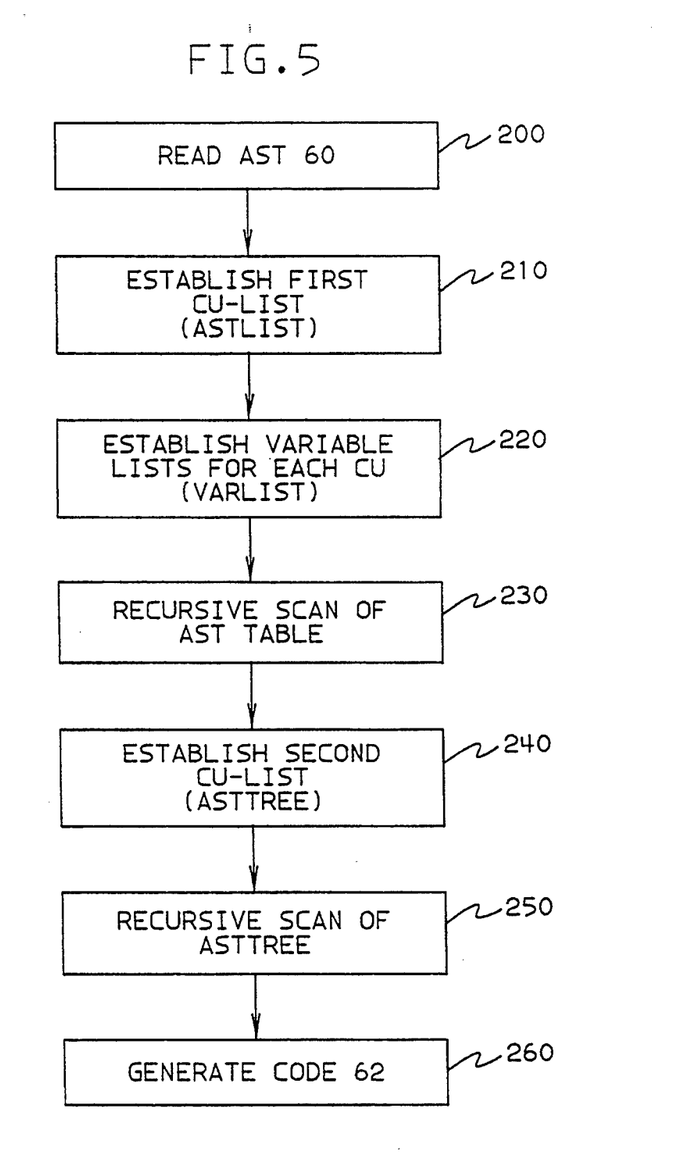
FIG. 5 is a flow diagram indicating how information required for the generation of interface code is extracted from an abstract syntax table in accordance with the present invention.

FIG. 5 shows an overview of the steps performed by the code generator 41 in order to produce the interface code. In step 200, the code generator 41 reads the AST 60. As mentioned above, the AST 60 may be read either in the form of an AST table (called USD-list in co-pending PCT application EP91/01642) or in the form of a tree. From the AST table is accessed information 42 about the variables in each of the communications units 34 described in the UID 30. The AST tree delivers data flow information 43 about the actual order in which the individual communications units 34 are processed.

In step 210, a first communications unit list (ASTList) is established as a double link list. This is done by reading the information out of the AST table and creating, for each communications unit 34, an element in the ASTList list. Each element contains the name of the communications unit, a pointer to the variable list (see below) and the names of checking routines associated with this communications unit 34.

In step 220, a series of variable lists (VarList) are established. For each communications unit 34, a separate variable list in the form of a double link list is established. Each element in the variable list contains information 42 about the variables associated with the communications unit 34, such as the variable name, the variable type (normal, multiline entry, outlist), the variable access (in, inout, out) and the length of the variable as well as any other information required. A pointer to the location of the variable list is associated with each element in the ASTList communications unit list.

The AST table is then recursively scanned (step 230) in order to fill the elements in the ASTList communications unit list and the variable lists (VarList) with information from the table.

In FIG. 5, the steps 210, 220 and 230 are shown separately for clarity of explanation. In practice, they may be carried out simultaneously.

Figure 6:
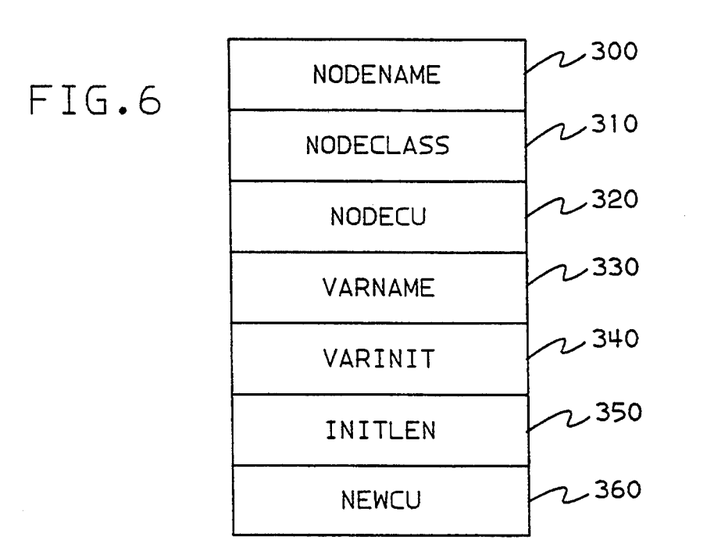
FIG. 6 is an example of an element in a ASTTree list.

After the information 42 relating to the communications unit 34 and to the variables 33 has been established in the double link lists, it is necessary to establish the order in which the communications units 34 are processed (data flow). This is shown in steps 240 and 250 of FIG. 5. The data flow information 43 relating to the order in which the communications units 34 are processed is stored in a second communications unit list which is given the name ASTTree list and is a double link list. For each communications unit 34 in the AST 60, an element is established in the double link ASTTree list which has the information 43 as shown in FIG. 6 associated with it. This list is stored in reserved memory space.

In FIG. 6, the NodeName 300 is the name of the node for which the list element is created. The NodeClass 310 indicates the declarative language element with which the node is associated, e.g. <SET>, <LINK>, <ITERATE>, etc. The NodeCU 320 is the name of the communications unit which is associated with the node, i.e. the communications unit 34 comprising the variables 33 which the node operates on. VarName 330 is the name of the variable whose value is used by the action associated with the node. It should be noted that not all nodes change or use variables and thus VarName 330 may be not be used. VarInit 340 is the initial value of the variable whose name is given by VarName 330. It is the value that is extracted from the UID 30 and may not initially be set. InitLen 350 is the initial length of the variable. NewCU 360 contains a pointer to the next communications unit 34 to be used in the AST tree.

In order to construct the double link list ASTTree, then the AST 60 is processed recursively. This is done by scanning every child node and placing the information in the ASTTree list, after which the nodes in the next higher hierarchical level are scanned and the information extracted and inserted in the correct place in the ASTTree list. This processing continues until all of the nodes in the AST tree have been scanned. Taking the AST 60 as shown in FIG. 4 as an example, a ASTTree list as shown in FIG. 7 is produced.

Figure 7:
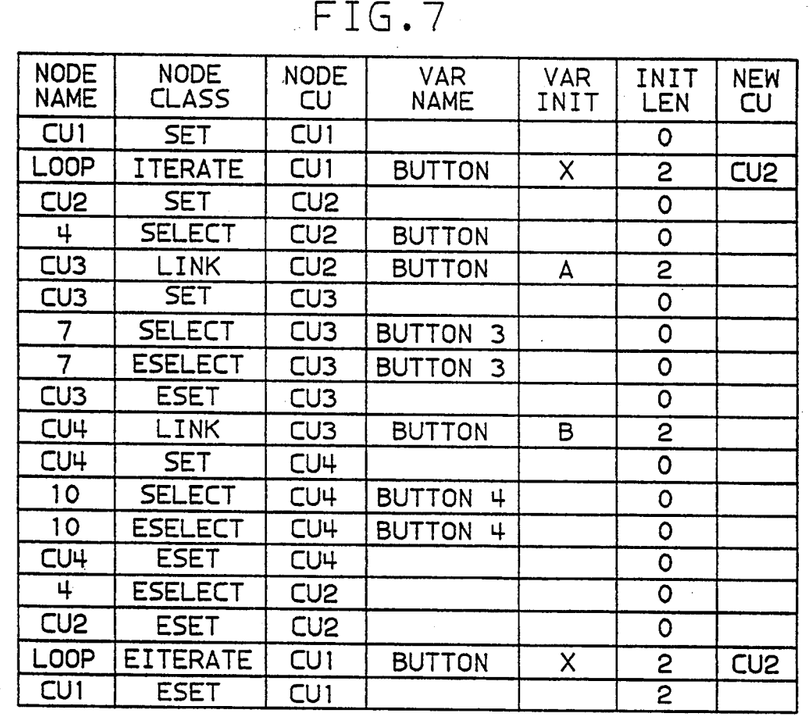
FIG. 7 is an example of a ASTTree list.
Figure 8:
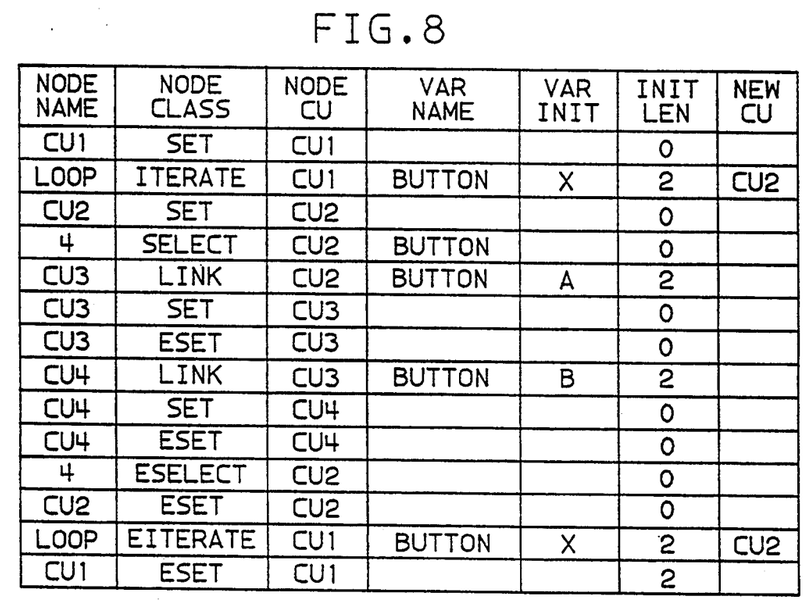
FIG. 8 is an example of an optimized ASTTree list.

The ASTTree list of FIG. 7 can be optimized in that for the generation of the interface code 62, it is not necessary to include in the list the <SELECT> entries which are directly followed by an <ESELECT> since this does not relate to the sequence in which communications units 34 are processed and will not expand into relevant code. Similarly if a <SET> node has the same communications unit name as the current communications unit name, then the <SET> entry and its corresponding <ESET> entry may be deleted from the second communications unit list ASTTree as it is not necessary for the interface code 62 to call the communications unit twice. FIG. 8 shows the optimized second communications unit list ASTTree.

Having now constructed the first (ASTList) and second (ASTTree) communications unit lists and the variable lists, it is now possible to generate (step 260) the interface code 62 using the code blocks 52 described above and stored in the code block file 51. The generation process is shown in FIG. 9.

Figure 9:
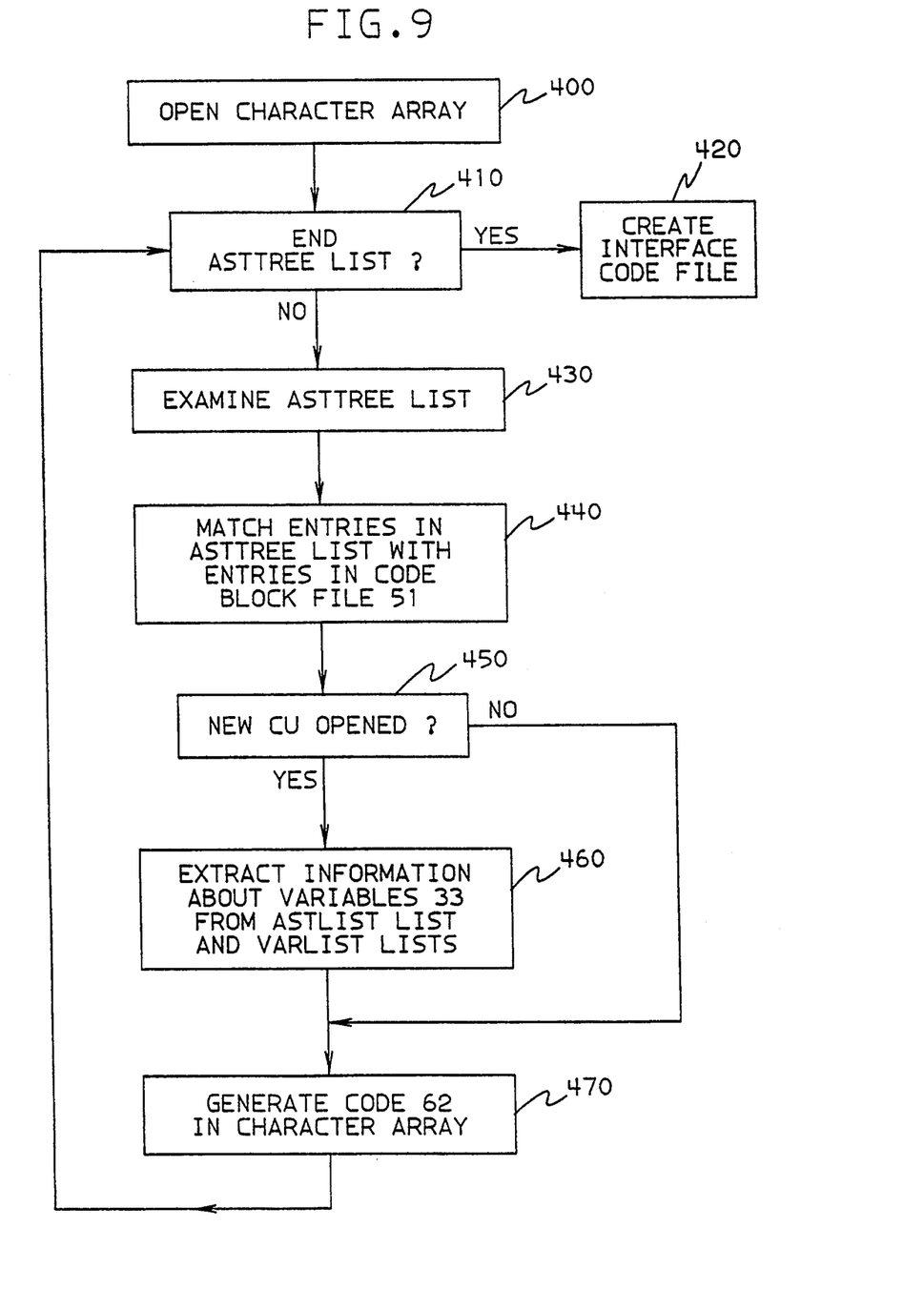
FIG. 9 is a flow diagram indicating the steps in producing the interface code from ASTList, ASTTree and VarList lists in accordance with the present invention.

In step 400 of FIG. 9, the code generator 41 opens a character array into which the generated code 62 is to be placed. The size of the character array is not of importance. In the current implementation it is 64K in size. Routines are, however, provided so that if the character array becomes filled then either a new character array is created or the existing information is stored and the current character array reused.

Step 410 examines the ASTTree list to see whether all of the elements of the ASTTree list have been examined. If this is the case, then step 420 is carried out in which the file containing the interface code 62 is established by reading the data out of the character array. If this is not the case, then the code generator 41 proceeds to examine the next entry or entries in the ASTTree list (step 430).

In step 440, the code generator 41 attempts to match an element or a combination of elements in the AST-Tree list with entries in the code block file 51. As explained above, certain combinations of certain declarative language elements may produce different code than the same language elements in a different order.

In step 450, a check is made to see whether a new communications unit 34 has been opened. This is done by examining the NewCU 360 entry in the element of the ASTTree list. If this is the case, then in step 460, the ASTList is examined to see what variables 33 are contained in this communications unit 34 and the information relating to the variables 33 retrieved from the VarList lists. This information is used to generate code which carries out all the necessary actions to establish the variables depending on their type (see above).

Finally in step 470, the code 62 is generated from the information extracted from the code block file 51, the ASTTree list and, if necessary, the ASTList list as well as the variable VarList lists. Intermediate registers are used to temporarily store the information extracted from these lists and the values from the intermediate registers are placed into the code blocks 52 as indicated.

After the interface code 62 has been generated, it must be compiled (step 115 of FIG. 2) with code compiler 61 to generate the executable user interface code 99, which is then linked with the presentation front end 80 in order to produce the interface to the business logic 40.

We claim:

1. A method for automatically generating computer code in a procedural language from a program coded in a declarative language, said program having elements specifying variables and communication units, and a data flow defined by a processing sequence of said communication units, comprising the steps of:
   providing a code block file having a set of code blocks defining a basic code structure of said procedural language code;
   analyzing said variables of said declarative language program to obtain variables information corresponding to said code blocks;
   analyzing said data flow of said declarative language program to obtain data flow information about the order of said processing sequence in which said communication units are used, said data flow information corresponding to said code blocks;
   extracting from said code block file fragments of said procedural language code; and
   combining said variables information and said data flow information with said fragments of said code block file to produce said computer code in said procedural language.

2. A method according to claim 1 wherein said analyzing variables comprises the steps of establishing a first communications unit list, each element of said first communications unit list comprising the names of said communications units in said declarative language and pointers to variable lists for those variables included in a communication unit.

3. A method according to claim 2 wherein said variable lists comprises at least a name of a variable, a type of a variable, and an access type of a variable.

4. A method according to claim 3 wherein said code block file comprises separate code blocks for each variable type.

5. A method according to claim 1 wherein said analyzing data flow comprises the steps of establishing a second communications unit list, where each element of said second communications unit list comprises a language element of the declarative language, the communications unit being operated on, and a pointer to the next communications unit to be operated on.

6. A method according to claim 5 wherein said code block file comprises separate code blocks for each declarative language element.

7. A method according to claim 1 wherein said code block file comprises separate code blocks for each variable type and each declarative language element.

8. A method for automatically generating interface code in a procedural language code for an applications program having a business logic in a procedural language code, and a user interface defined in a declarative language, said user interface having variables and communications units to be processed in a predetermined order, said user interface providing an interface between a user and said applications program comprising the steps of:
   providing a code block file having a set of code blocks defining a basic code structure of said procedural language code;
   analyzing said user interface to establish information on said variables used in said user interface that correspond to said code blocks;
   analyzing said user interface to establish data flow information on said order in which said communications units in said user interface are processed and that correspond to said code blocks;
   extracting from said code block file fragments of said procedural language code corresponding to said information on said variables and said data flow information; and
   combining said information on said variables and said data flow information with said fragments extracted from said code block file to produce said interface code in said procedural language code.

9. A method according to claim 8 wherein said step of analyzing said user interface to establish information on said variables used in said user interface comprises the steps of establishing a first communications unit list, each element of said first communications unit list comprising the names of said communications units in said declarative language and pointers to variable lists for those variables included in the communication unit, whereby the information in said variable lists comprises at least a name of the variable, a type of the variable, and an access type of the variable.

10. A method according to claim 9 wherein said code block file comprises separate code blocks for each variable type.

11. A method according to claim 8 wherein said code block file comprises code establishing an entry for said variables in a variable table which can be accessed by said business logic.

12. A method according to claim 8 wherein analyzing said user interface to establish data flow information on said order of said communications units comprises establishing a second communications unit list, each element of said second communications unit list comprising a declarative language element, the communications unit being operated on, and a pointer to the next communications unit to be operated on.

13. A method according to claim 12 whereby said code block file comprises separate code blocks for each declarative language element.

14. A method according to claim 8 where said code block file comprises separate code blocks for each variable type, separate code blocks for each element of said declarative language, and code for establishing entry of said variables into a variable table accessible by said business logic.

15. A computer system for generating an interface code in a procedural language from a declarative language program that comprises:

an applications program means comprising a business logic means for performing a predetermined task, and an interface declaration means having variables and communications units processed in a predetermined order, said interface declaration means coded as said declarative language program for providing a user interface between an end user and said applications program; and a code generator means for analyzing said applications program and generating said user interface code, said code generator means comprising:

a code block file means having a set of code blocks for defining a basic code structure of said procedural language code;

data analyzer means for analyzing said declarative language program to obtain information on said variables and said communications units;

a first communications unit list means for defining said order said communications units in said declarative language program are processed;

a second communications unit list means for defining said variables associated with said communications units;

a variables list means, having a plurality of variable lists, for providing attribute information on said variables in said communications units; and means for combining code blocks from said code block file, entries from said first communications unit list means and said second communications unit list means, and said plurality of variable lists to produce said interface code.

16. A computer system according to claim 15 wherein said interface code is independent of the interface used.

* * * * *